United States Patent

Diachina

[11] Patent Number: 5,835,860
[45] Date of Patent: Nov. 10, 1998

[54] OPERATION AND ADMINISTRATION OF MOBILE STATION USER GROUPS IN WIRELESS COMMUNICATIONS SYSTEMS

[75] Inventor: John Diachina, Garner, N.C.

[73] Assignee: Ericsson Inc., Research Triangle Park, N.C.

[21] Appl. No.: 819,961

[22] Filed: Mar. 18, 1997

Related U.S. Application Data

[63] Continuation of Ser. No. 416,344, Apr. 4, 1995, abandoned.

[51] Int. Cl.⁶ ...................................................... H04Q 7/38
[52] U.S. Cl. .......................... 455/458; 455/519; 455/567
[58] Field of Search .................................... 455/458, 463, 455/445, 422, 518, 519, 550, 567, 403, 513

[56] References Cited

U.S. PATENT DOCUMENTS

| | | | |
|---|---|---|---|
| 4,768,218 | 8/1988 | Yorita | 379/61 |
| 5,014,295 | 5/1991 | Kunihiro | 455/567 |
| 5,239,572 | 8/1993 | Saegusa et al. | 379/58 X |
| 5,255,308 | 10/1993 | Hashimoto et al. | 455/463 |
| 5,371,781 | 12/1994 | Ardon | 379/59 |
| 5,454,032 | 9/1995 | Pinard et al. | 455/445 |
| 5,471,646 | 11/1995 | Schultz | 455/519 |

FOREIGN PATENT DOCUMENTS

WO 94/17644  8/1994  WIPO.

OTHER PUBLICATIONS

Electronic Industries Association, EIA/TIA Interim Standard –IS–41.3 B, Dec. 1991, pp. 6–9.

*Primary Examiner*—Dwayne D. Bost
*Assistant Examiner*—William G. Trost
*Attorney, Agent, or Firm*—Burns, Doane, Swecker & Mathis, L.L.P.

[57] ABSTRACT

Methods for operating and administering mobile station user groups in a wireless communications system. In one embodiment, a user group identification code is assigned to a plurality of mobile stations to form a user group, wherein the number of mobile stations in the user group is less than the total number of mobile stations in the entire communications system, and wherein the user group identification code is distinguishable from a unique mobile station identification code associated with each mobile station in the user group. A page message from the system to the user group is transmitted using the user group identification code when a terminating call to the user group is requested. A user group specific page indication is then generated at the mobile stations indicating to a user of each mobile station that the page message has been received. A page response message is then transmitted to the system from mobile stations whose users acknowledge the page indication. Finally, a channel assignment for the call is granted to the mobile station which responds first.

20 Claims, 5 Drawing Sheets

| HEADER INFO | USER GROUP ID | LAYER 3 MESSAGE | CRC |

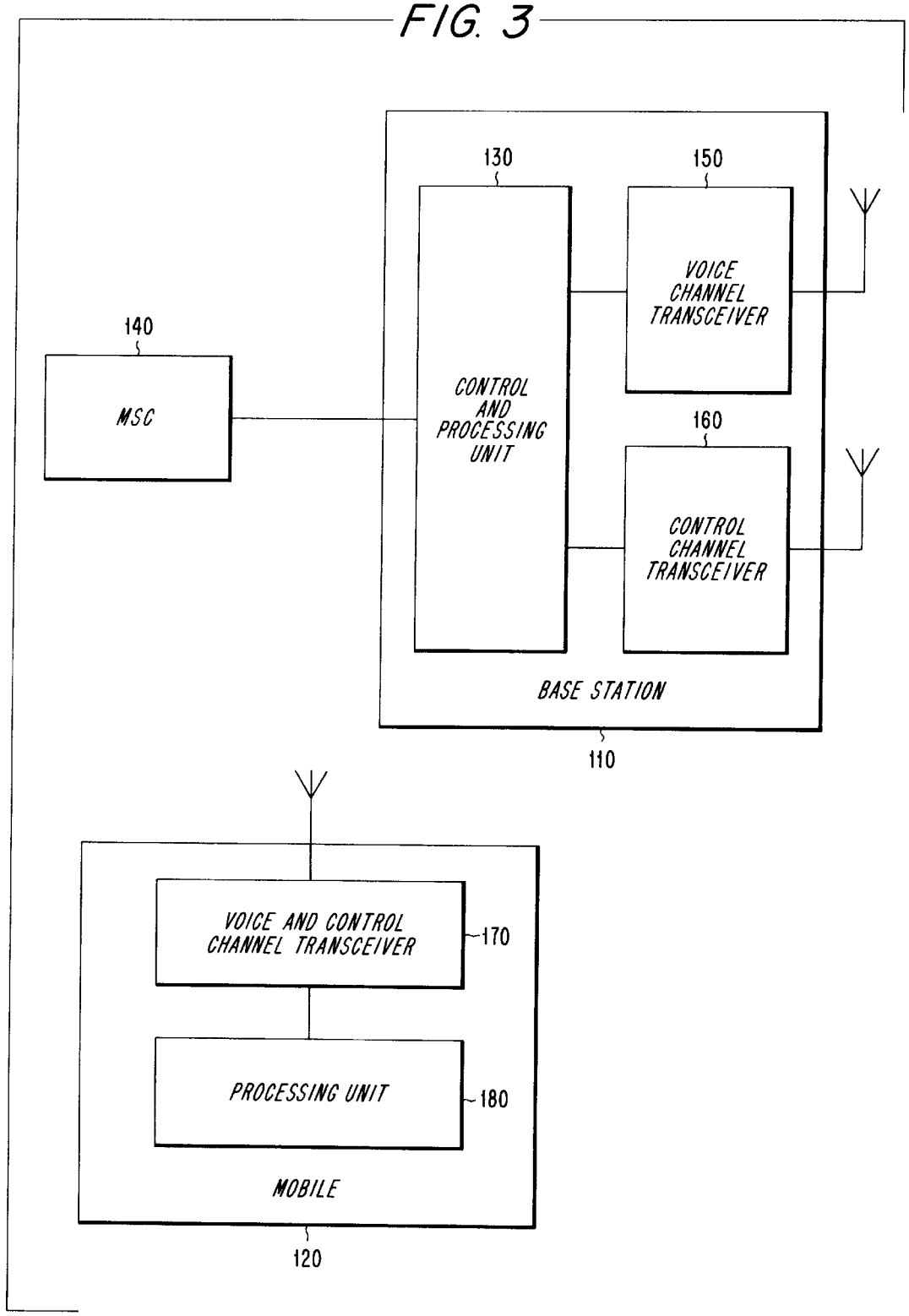

OPERATION AND ADMINISTRATION OF MOBILE STATION USER GROUPS IN WIRELESS COMMUNICATIONS SYSTEMS

This application is a continuation of application Ser. No. 08/416,344, filed Apr. 4, 1995, now abandoned.

FIELD OF THE INVENTION

The present invention relates to a method for transmitting messages between mobile stations and a central switching system, and more particularly to a method for transmitting messages such that only a subset of the general population of mobile stations are allowed to receive and potentially respond to the transmitted messages.

BACKGROUND OF THE INVENTION

In a typical cellular radio system, a geographical area, e.g., a metropolitan area, is divided into several smaller, contiguous radio coverage areas called "cells". The cells are served by a series of fixed radio base stations called "base stations". The base stations are connected to and controlled by a mobile switching center (MSC). The MSC in turn is connected to the landline (wireline) public switched telephone network (PSTN). The telephone users (mobile subscribers) in the cellular radio system are provided with portable (hand held), transportable (hand carried), or mobile (car mounted) telephone units (mobile stations) which communicate voice and/or data with the MSC through a nearby base station. The MSC switches calls between and among wireline and mobile subscribers, controls signalling to the mobile stations, compiles billing statistics, and provides for the operation, maintenance, and testing of the system.

FIG. 1 illustrates the architecture of a conventional cellular radio system built according to the Advanced Mobile Phone System (AMPS) standard. In FIG. 1, an arbitrary geographic area may be seen divided into a plurality of contiguous radio coverage areas, or cells C1–C10. While the system of FIG. 1 is, for illustration purposes, shown to include only ten cells, the number of cells may be much larger in practice. Associated with and located in each of the cells C1–C10 is a base station designated by a corresponding one of a plurality of base stations B1–B10. Each of the base stations B1–B10 includes a plurality of channel units, each comprising a transmitter, a receiver and a controller, as is well known in the art.

In FIG. 1, the base stations B1–B10 are located at the center of the cells C1–C10, respectively, and are equipped with omni-directional antennas transmitting equally in all directions. In this case, all the channel units in each of the base stations B1–B10 are connected to one antenna. However, in other configurations of the cellular radio system, the base stations B1–B10 may be located near the periphery, or otherwise away from the centers of the cells C1–C10 and may illuminate the cells C1–C10 with radio signals directionally. For example, the base station may be equipped with three directional antennas, each one covering a 120 degree sector cell as illustrated in FIG. 2. In this case, some channel units will be connected to one antenna covering one sector cell, other channel units will be connected to another antenna covering another sector cell, and the remaining channel units will be connected to the remaining antenna covering the remaining sector cell. In FIG. 2, therefore, the base station serves three sector cells. However, it is not always necessary for three sector cells to exist and only one sector cell need be used to cover, for example, a road or a highway.

Returning to FIG. 1, each of the base stations B1–B10 is connected by voice and data links to a mobile switching center MSC 20 which is, in turn, connected to a central office (not illustrated) in the public switching telephone network (PSTN), or a similar facility, e.g., an integrated services digital network (ISDN). The relevant connections and transmission modes between the mobile switching center MSC 20 and the base stations B1–B10, or between the mobile switching center MSC 20 and the PSTN or ISDN, are well known to those of ordinary skill in the art and may include twisted wire pairs, coaxial cables, fiber optic cables or microwave radio channels operating in either analog or digital mode. Further, the voice and data links may either be provided by the operator or leased from a telephone company (telco).

With continuing reference to FIG. 1, a plurality of mobile stations M1–M10 may be found within the cells C1–C10. Again, while only ten mobile stations are shown in FIG. 1, the actual number of mobile stations may be much larger in practice and will generally exceed the number of base stations. Moreover, while none of the mobile stations M1–M10 may be found in some of the cells C1–C10, the absence or presence of the mobile stations M1–M10 in any particular one of the cells C1–C10 depends on the individual desires of each of the mobile subscribers who may travel from one location in a cell to another or from one cell to an adjacent or neighboring cell.

Each of the mobile stations M1–M10 includes a transmitter, a receiver, a controller and a user interface, e.g., a telephone handset, as is well known in the art. Each of the mobile stations M1–M10 is assigned a mobile identification number (MIN) which, in the United States, is a digital representation of the telephone directory number of the mobile subscriber. The MIN defines the subscription of the mobile subscriber on the radio path and is sent from the mobile station to the MSC 20 at call origination and from the MSC 20 to the mobile station at call termination. Each of the mobile stations M1–M10 is also identified by an electronic serial number (ESN) which is a factory set, "unchangeable" number designed to protect against the unauthorized use of the mobile station. At call origination, for example, the mobile station will send the ESN to the MSC 20. The MSC 20 will compare the received ESN to a "black list" of the ESN's of mobile stations which have been reported to be stolen. If a match is found, the stolen mobile station will be denied access.

Each of the cells C1–C10 is allocated a subset of the radio frequency (RF) channels assigned to the entire cellular system by the concerned government authority, e.g., the Federal Communications Commission (FCC) in the United States. Each subset of RF channels is divided into several voice or speech channels which are used to carry voice conversations, and at least one paging/access or control channel which is used to carry supervisory data messages, between each of the base stations B1–B10 and the mobile stations M1–M10 in its coverage area. Each RF channel comprises a duplex channel (bidirectional radio transmission path) between the base station and the mobile station. The RF channel consists of a pair of separate frequencies, one for transmission from the base station (reception by the mobile station) and one for transmission by the mobile station (reception by the base station). Each channel unit in the base stations B1–B10 normally operates on a preselected one of the radio channels allocated to the corresponding cell, i.e., the transmitter TX and receiver RX of the channel unit are tuned to a pair of transmit and receive frequencies, respectively, which does not change. The transceiver (TX/

RX) of each mobile station M1–M1O, however, may tune to any of the radio channels specified in the system.

In typical land line systems, remote stations and control centers are connected by copper or fiber optic circuits which have a data through put capacity and performance integrity that is generally significantly better than the data through put capacity and performance integrity provided by an air interface in a cellular telephone system. As a result, the conciseness of overhead required to manage any selected communication link protocol for land line systems is of secondary importance. In cellular telephone systems, an air interface communications link protocol is required in order to allow a mobile station to communicate with a cellular switching system. A communications link protocol is used to initiate and to receive cellular telephone calls.

The electromagnetic spectrum available for use by cellular telephone systems is limited and is divided into units called channels. Individual channels are used as communication links either on a shared basis or on a dedicated or reserved basis. When individual channels are used as communication links on a shared basis, multiple mobile stations may either listen to or contend for the same channels. In the contending situation, each shared channel can be used by a plurality of mobile stations which compete to obtain exclusive use of the channel for a limited period of time. On the other hand, when individual channels are used as communication links on a dedicated basis, a single mobile station is assigned the exclusive use of the channel for as long as it is needed.

In light of the generally reduced data through put capacity and performance integrity afforded by an individual channel in a channel sharing situation in a cellular telephone environment, the selection of an efficient air interface protocol to serve as the basis for the communication link and its economic use by cellular applications becomes paramount. The communication link protocol is commonly referred to as a layer 2 protocol within the communications industry and its functionality includes the delimiting and framing of higher level messages. Layer 2 protocol framing mechanisms of bit stuffing and flag characteristics are commonly used in land line networks today to frame higher layer messages, which are referred to as layer 3 messages. These layer 3 messages may be sent between communicating layer 3 peer entities residing within the mobile stations and cellular switching systems. The specific types of layer 3 messages and their sequence of exchange between a mobile station and a cellular switching system is what defines a cellular application.

The present invention relates to a method for transmitting messages between mobile stations and a central switching system, and more particularly to a method for transmitting these messages such that only a subset of the general population of mobile stations are allowed to receive and potentially respond to these messages. This subset of the general population of mobile stations may be considered as a user group having membership requirements that must be satisfied for participation in the user group.

SUMMARY OF THE INVENTION

According to one embodiment of the present invention, a method for user group operation is disclosed whereby a single member of the user group is deemed the winner of a user group terminating call attempt and as such is granted the terminating call.

According to one embodiment of the present invention, a method for completing a call in a cellular communication system to a mobile station which is part of a user group is disclosed. First, a user group identification code is assigned to a first plurality of mobile stations, wherein said first plurality is less than the total number of mobile stations in said system. A page message from said cellular system to said user group is transmitted using said user group identification code when a terminating call has been requested to the user group. A user group specific page indication is then generated at the first plurality of mobile stations in response to receiving the page message. A page response message is then transmitted to said cellular system from mobile stations whose users acknowledge the page indication. Finally, a channel assignment for said call is granted to the mobile station which sends the first received page message received at said cellular system.

BRIEF DESCRIPTION OF THE DRAWINGS

The present invention will now be described in more detail with reference to preferred embodiments of the invention, given only by way of example, and illustrated in the accompanying drawings, in which:

FIG. 3 illustrates a block diagram of an exemplary cellular mobile radio telephone system;

DETAILED DESCRIPTION

Figure 1:
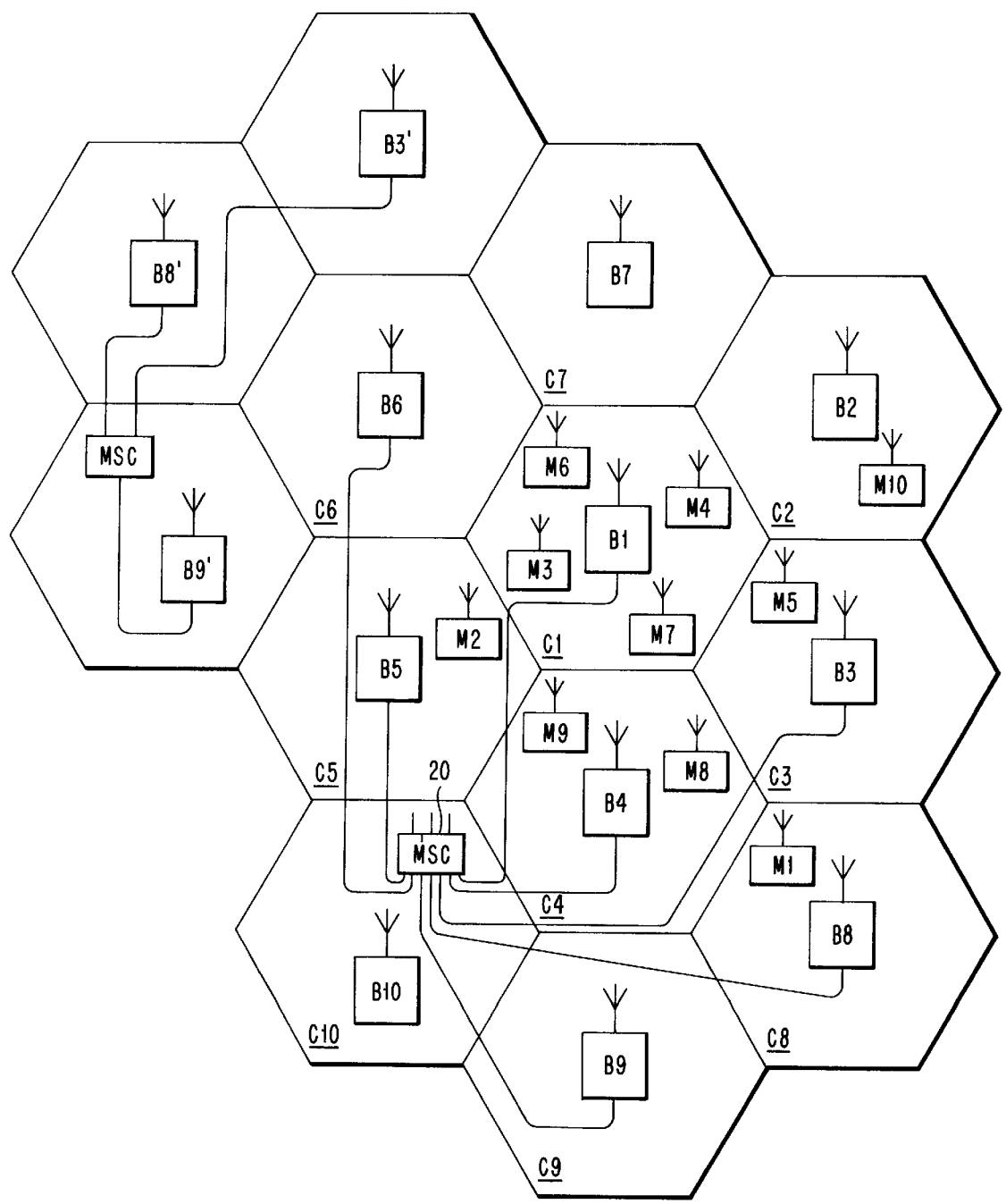
FIG. 1 illustrates the architecture of a conventional cellular radio system.

Although the description hereinafter focuses on systems which comply with IS-54B and its successors, the principles of the present invention are equally applicable to a variety of wireless communication systems, e.g., cellular and satellite radio systems, irrespective of the particular mode of operation (analog, digital, dual mode, etc.), the access technique (FDMA, TDMA, CDMA, hybrid FDMA/TDMA/CDMA, etc.), or the architecture (macrocells, microcells, picocells, etc.). As will be appreciated by one skilled in the art, the logical channel which carries speech and/or data may be implemented in different ways at the physical layer level. The physical channel may be a relatively narrow RF band (FDMA), a time slot on a radio frequency (TDMA), a unique code sequence (CDMA), or a combination of the foregoing. For purposes of the present invention, the term "channel" means any physical channel which can carry speech and/or data, and is not limited to any particular mode of operation, access technique or system architecture.

FIG. 3 represents a block diagram of an exemplary cellular mobile radio telephone system according to one embodiment of the present invention. The system illustrates an exemplary base station 110 and a mobile station 120. The base station 110 includes a control and processing unit 130 which is connected to the mobile switching center MSC 140 which in turn is connected to the public switch telephone network (not illustrated).

The base station 110 for a cell includes a plurality of voice channels handled by a voice channel receiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 is in an idle mode, the mobile periodically scans the control channels of base stations like base station 110 to determine which cell to lock onto or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock onto. The received control channel information not only includes absolute information concerning the cell with which it is associated, but also contains relative information concerning other cells approximate to the cell which the control channel is associated.

According to one embodiment of the present invention, a mobile subscriber can request participation in a user group in a variety of ways. For instance, a mobile station may be preregistered for user group operation within one or more specific user groups as a result of its service subscription in its home MSC. Such a mobile station could then attempt to activate user group operation by requesting participation in a specific user group during registration with any visited MSC that broadcast support for user group operation in general. When a MSC receives a registration wherein the mobile subscriber is requesting that the mobile station be actively included in a specific user group, the serving MSC can contact the home MSC to determine whether or not the requesting mobile station is allowed to activate user group operation for the requested user group. The home MSC informs the visited MSC of the home MSC's decision to either approve or deny service for the requested user group. If the home MSC decides to approve the request, the serving MSC sends back a registration acceptance message to the requesting mobile station. If the mobile station does not receive a registration accept message, the mobile station will know that its request has been denied and will not activate user group operation for that user group.

Figures 2, 4:
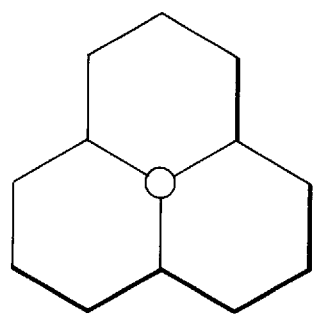
FIG. 2 illustrates a three sector cell which may be used in the system shown in FIG. 1.
FIG. 4 illustrates a layer 2 protocol user group ID frame according to one embodiment of the present invention.

In order to send layer 3 messages to distinct user groups, a user group identity field (UGID) can be included in the SPACH layer 2 protocol. By using this group identity, the communication system can page the entire user group in any given paging area by sending only one page message. A user group ID frame is illustrated in FIG. 4. A further description of layer 2 protocol can be found in U.S. patent application Ser. Nos. 08/331,816 and 08/332,114, both of which are incorporated herein by reference.

Figure 5:
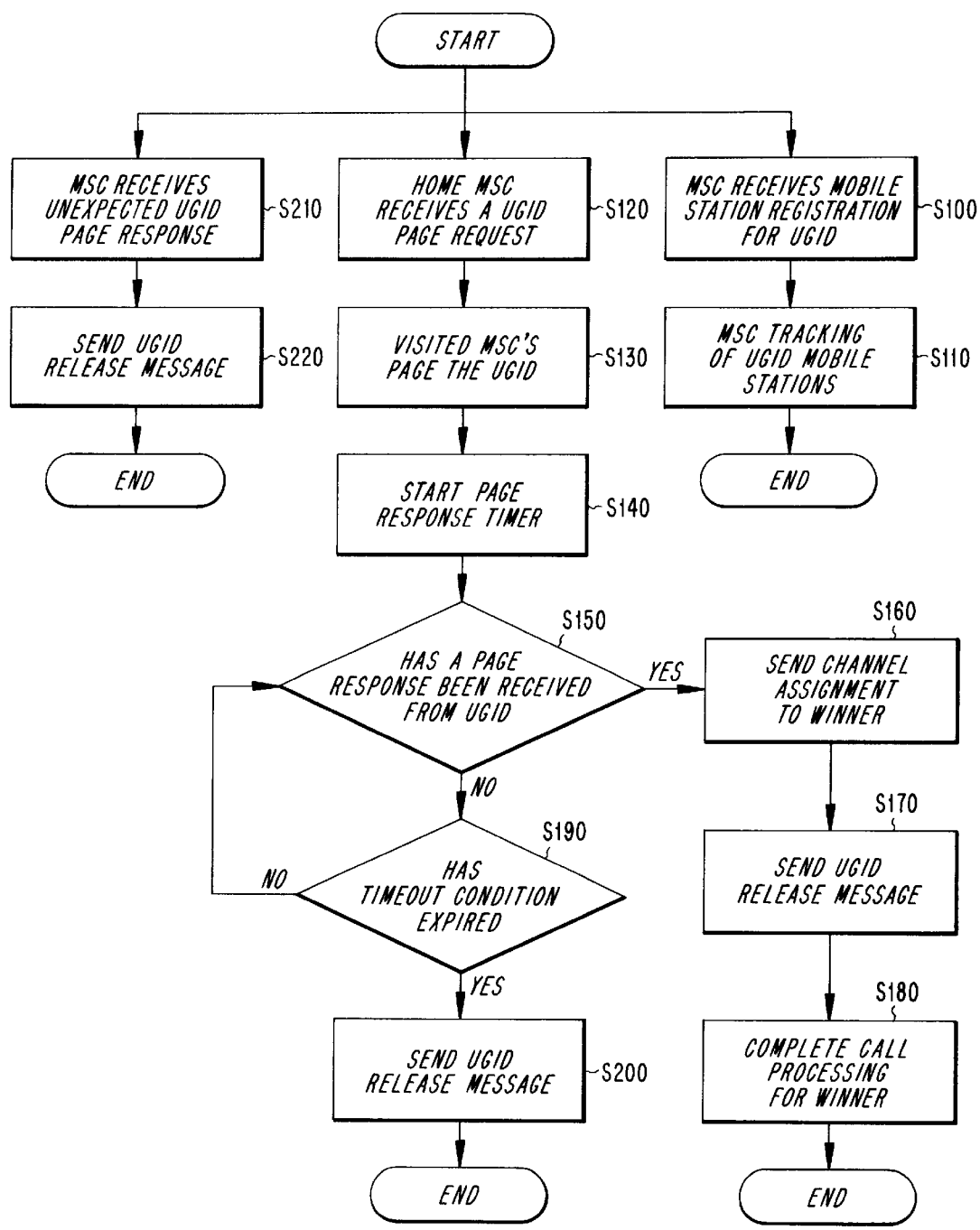
FIG. 5 illustrates a flow chart of a method for user group operation from a mobile switching centers according to one embodiment of the present invention.

The present invention will now be described from two different perspectives: from the perspective of a MSC; and from the perspective of a mobile station. First, the user group operation from the MSC's perspective will be described with reference to FIG. 5 and then the user group operation from the mobile station's perspective will be described with reference to FIG. 6.

In present cellular systems, mobile stations are allowed to roam into areas covered by MSCs other than their home MSC and also into other cellular systems administered by other cellular operators. When a mobile station roams, the mobile station will register with the MSC responsible for the area in which the mobile station is located in step S100. During the registration, the mobile station can request activation for a specific user group as described above. If a roaming mobile station successfully registers for user group operation in a visited MSC, the visited MSC may track the whereabouts of the registered mobile station according to the mobile station's identity (MSID) and its assigned user group identification (UGID) in step S110. An MSC tracking a mobile station's location using MSID and UGID will maintain a list of all paging areas in which there exists one or more mobile stations that have registered for user group operation for a specific UGID. As a result, an MSC may track multiple UGIDs in parallel, where each tracked UGID may translate into a different set of paging areas.

When a mobile station registers with a visited MSC, the location of the mobile station is sent back to the home MSC where it is stored. As a result, when the home MSC receives a page request for a specific user group in step S120, the page request can be routed to one or more visited MSCs which serve the areas in which the mobile stations, having that user group activated, have roamed. It will be apparent to one skilled in the art that the home MSC can specify whether a single call assignment should be made to a single mobile station or whether each visited MSC can grant a channel assignment to one mobile station, thus resulting in a conference call. The visited MSCs then transmit, in step S130, a user group page message over the appropriate radio channels (control channels) determined according to MSID/UGID tracking performed by the MSCs. The visited MSCs then start a page response timer in step S140 and wait for a mobile station to send a page response message in step S150. If a page response message is received before a time out condition is experienced, the MSC grants a channel assignment, over which the call takes place, to the mobile station identified by the first received page response message in step S160. The MSC then transmits an UGID specific release message in step S170, which tells the other mobile stations to abort the user group call attempt. Finally, the MSC completes the necessary call processing for the winning mobile station in step S180.

However, if the MSC does not receive a page response message in step S150 before the MSC determines that a time out condition has occurred in step S190, the MSC transmits a UGID specific release message in step S200 which indicates that all of the mobile stations in the user group should abort the user group call attempt.

Furthermore, the MSC could receive an unexpected UGID page response. For example, the MSC could receive a page response message from a second mobile station after having already granted the channel assignment to a first mobile station. When the MSC receives an unexpected page response message in step S210, the MSC transmits a UGID specific release message in step S220 which indicates that all of the mobile stations in the user group should abort the user group call attempt.

Figure 6:
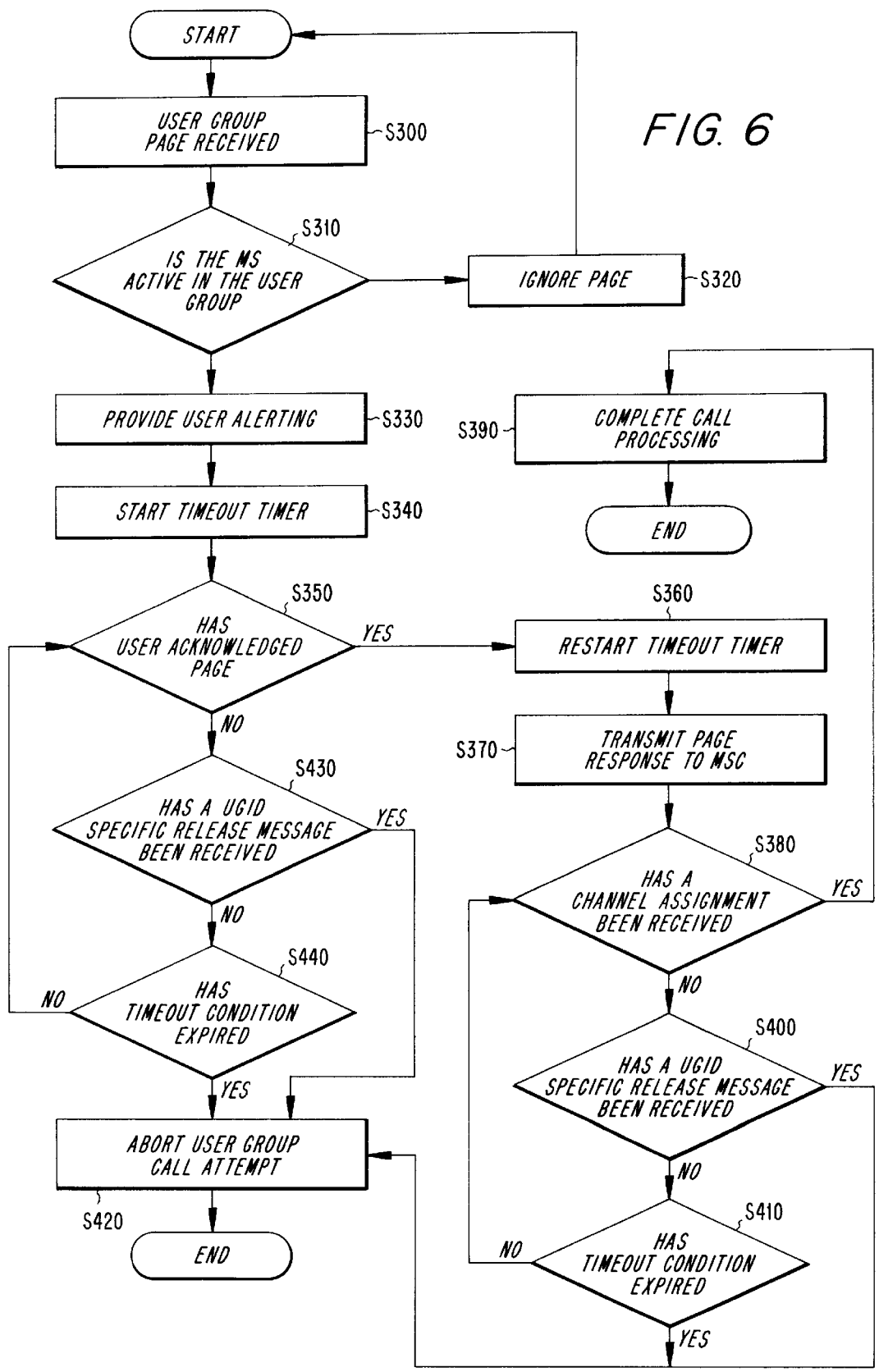
FIG. 6 illustrates a flow chart of a method for user group operation from a mobile station's perspective according to one embodiment of the present invention

The user group operation from the perspective of the mobile station will now be described with reference to FIG. 6. When the mobile station receives a user group page message, in step S300, the mobile station determines whether the mobile station is active in the identified user group in step S310. If the mobile station is not active in the identified user group, then the mobile station ignores the user group page message in step S320. However, if the mobile station is active in the identified user group, the mobile station responds in step S330 by providing some form of alerting to the mobile station user. According to one embodiment of the present invention, a special tone or signal is used to indicate that a user group call termination is being attempted. The specific form of alerting the mobile station user (tones and cadences) may be identified in the received page message. When a mobile station is in the process of alerting the user to the fact that a user group page message has been received, the mobile station is considered to be in a user group alerting state. Upon first entering the user group alerting state a mobile station starts a timer in step S340. The mobile station then waits for the user to acknowledge the user group page message in step S350. While the mobile station is waiting for an acknowledgement, the mobile station determines whether a user group release message has been received or if a time out condition exists in steps S430 and S440. If either a user group release message is received or a time out condition exists before the user acknowledges the user group page message, the mobile station aborts the user group call attempt. When a mobile station is in the user group alerting state and the user responds in step S350 to the special paging tone or signal by pushing at least one button, the mobile station resets the time out timer in step S360 and transmits a page response message to the serving MSC in step S370, wherein the page response contains, among other information, the identity of the responding mobile station and its active UGID. Of all the mobile stations that transmit a page response message, only one mobile station (the winner) is granted a channel assignment over which the call takes place. Thus, the mobile station waits for a channel assignment in step S380. While the mobile station is waiting for a channel assignment, the mobile station determines whether a user group release message has been received or a time out condition exists in steps S400 and S410. If a user group release message is received or a time out condition exists before a channel assignment is received, the mobile station aborts the user group call attempt. However, if the mobile station does receive a channel assignment, the mobile station and the serving MSC complete the call processing in step S390.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

I claim:

1. A method for completing a call in a communications system to a mobile station which is participating in a user group, wherein a number of mobile stations participating in the user group is less than a total number of mobile stations in the system, comprising the steps of:

establishing a user group identification code which is distinguishable from mobile station identification numbers assigned to mobile stations in the system, wherein the user group identification code defines a user group in which designated mobile stations in the system can selectively request participation;

transmitting a page message from the system to mobile stations participating in the user group using the user group identification code when a call to the user group has been requested;

generating a user group specific page indication at mobile stations participating in the user group to indicate that the page message has been received;

transmitting a page response message to the system from mobile stations whose users acknowledge the page indication; and granting a channel assignment for the requested call to the mobile station sending the page response message which is first received at the system.

2. A method according to claim 1, wherein mobile stations permitted to participate in the user group are preprogrammed with the user group identification code.

3. A method according to claim 1, further comprising the steps of:

transmitting release messages to mobile stations whose page response messages do not result in a channel assignment;

aborting an attempt to answer the requested call at a mobile station receiving a release message.

4. A method according to claim 1, wherein each page response message contains a mobile station identification code identifying the mobile station sending the page response message and the user group identification code associated with the page response message.

5. A method according to claim 1, further comprising the step of:

tracking the location of mobile stations which are participating in a specific user group using both user group identification code and mobile station identification code information.

6. A method according to claim 1, wherein special signalling is used to provide the user group specific page indication.

7. A method according to claim 6, wherein the page message indicates the special signalling which is used for the page indication.

8. A method according to claim 1, wherein said designated mobile stations request participation in said user group when registering with said system.

9. A method according to claim 8, wherein said designated mobile stations request participation in said user group by transmitting said user group identification code to said system during registration with said system.

10. A method for paging a group of mobile stations participating in a user group in a communications system, comprising the steps of:

establishing a user group identification which is distinguishable from mobile station identifications assigned to mobile stations in the system, wherein the user group identification defines a user group in which designated mobile stations in the system can selectively request participation;

receiving mobile station registrations at mobile switching centers as mobile stations roam throughout the system, wherein registrations from mobile stations intending to participate in the user group contain said user group identification;

transmitting a page message for said user group in paging areas controlled by mobile switching centers in which mobile stations participating in the user group have registered;

starting a page response timer, wherein said mobile switching centers generate a user group release message if none of the mobile stations participating in said user group respond to said page message within a predetermined period of time;

generating a user group specific page indication at mobile stations participating in the user group in response to receiving the page message;

transmitting a page response message to at least one of said mobile switching centers from mobile stations whose users acknowledge the page indication; and granting a channel assignment to the mobile station which sends the page response message first received at the system.

11. A method according to claim 10, wherein mobile stations permitted to participate in the user group are preprogrammed with said user group identification.

12. A method according to claim 10, further comprising the steps of:
transmitting release messages to mobile stations whose page response messages do not result in a channel assignment;
aborting an attempt to respond to the page message at a mobile station receiving a release message.

13. A method according to claim 10, wherein each page response message contains an identity of the responding mobile station and the user group identification.

14. A method according to claim 10, wherein special signalling is used to provide said page indication.

15. A method according to claim 14, wherein said page message indicates the special signalling which is used for the page indication.

16. A method according to claim 8, wherein said designated mobile stations request participation in said user group when registering with said system.

17. A method according to claim 16, wherein said designated mobile stations request participation in said user group by transmitting said user group identification code to said system during registration with said system.

18. A method for completing a call in a communications system, comprising the steps of:
establishing a user group identification code for a user group in which mobile stations in the system can request active participation;
transmitting the user group identification code from a mobile station to the system during registration of the mobile station with the system, wherein said transmission of the user group identification code during registration represents a request that the registering mobile station be permitted to actively participate in the user group;
determining, at the system, whether the registering mobile station should be permitted to actively participate in the user group, and selectively approving the request of the registering mobile station in dependence upon said determination;
tracking, at the system, the location of mobile stations which have been approved to actively participate in the user group;
transmitting a page message from the system to the approved mobile stations when a call to the user group is requested; and
granting a channel assignment for the requested call to a first one of the approved mobile stations to respond to the page message.

19. A method according to claim 18, further comprising the step of:
sending a registration acceptance message from the system to the registering mobile station when the system determines that the registering mobile station should be permitted to actively participate in the user group.

20. A method according to claim 18, further comprising the steps of:
generating a user group specific page indication at the approved mobile stations to indicate that the page message has been received; and
transmitting page response messages to the system from approved mobile stations whose users acknowledge the user group specific page indication.

* * * * *